UNITED STATES PATENT OFFICE.

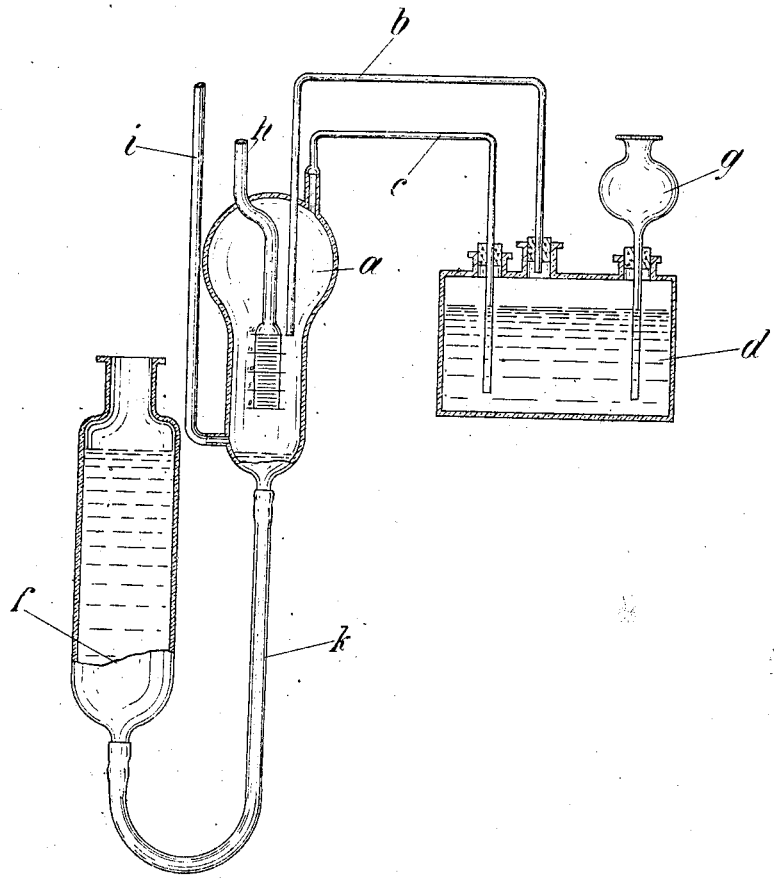

OTTO MATZERATH, OF AACHEN, GERMANY.

APPARATUS FOR ANALYZING GASES.

1,154,792.

Specification of Letters Patent. Patented Sept. 28, 1915.

Application filed October 9, 1914. Serial No. 865,934.

*To all whom it may concern:*

Be it known that I, OTTO MATZERATH, engineer, a subject of the King of Prussia, residing at No. 8 Richardstrasse, Aachen, in the Kingdom of Prussia, Empire of Germany, have invented certain new and useful Improvements in Apparatus for Analyzing Gases; and I do hereby declare the following to be a full, clear, and exact description of the invention, such as will enable others skilled in the art to which it appertains to make and use the same.

My present invention relates to an apparatus for analyzing gases, with which the gas to be examined is, by means of a hydraulic pumping arrangement, led from a measuring vessel into an absorption-vessel and the non-absorbed remainder of the gas led back from the latter again into the measuring vessel.

Apparatuses for the analyzing of gases are already well-known in which a certain quantity of gas collected in a measuring vessel is driven on to the top-surface of the absorbing liquid through a constantly open connection or duct so as to allow the non-absorbed remainder of the gas to return easily into the measuring vessel through said duct. It is of high importance to lead back the remaining gas which has not been absorbed, to the measuring vessel, because it is only by ascertaining in this vessel the volumes of the remaining quantity of gas, that one can see which percentage of absorbed components the gas to be examined contains. With such devices the absorption of the whole gas quantity takes place only at the top-surface of the absorbing liquid and at the wet glass-parts of the vessel; therefore a temporally long contact of the gas with the absorbing-means is necessary in order to obtain a full absorption of the absorbable components of the gas. The number of analyses which can be made with such an apparatus, is therefore restricted and the utilization of the absorbing liquid is only a bad one. Besides, such apparatuses are not at all fit for the examination of gases containing a relatively large proportion of absorbable constituent from want of a perfect absorption.

In order to gain a quicker succession of the analyses, a complete absorption of highly valuable gases as well as a better utilization of the absorbing liquid, apparatuses have been constructed by means of which the gas is not driven against the top-surface of the absorbing liquid but through the same so that the gas rises in the shape of bubbles in the said liquid. These apparatuses possess, however, the disadvantage that the non-absorbed remainder of gas cannot any longer get back from the vessel containing the absorbing liquid into the measuring vessel through the duct connecting these two vessels. This makes the control of the absorption impossible, which can only be effected by driving the remaining gas a second or a third time to the absorbing liquid. Consequently the volume of the absorbed gas cannot be read from the measuring vessel, in which the gas was collected, because, as already mentioned, the remaining gas cannot flow back into this vessel. Besides, there cannot take place in this apparatus a full utilization of the absorbing means, because it is not possible to drive the same gas-remainder several times through the absorbing liquid for the purpose of examining the liquid with regard to its absorptive effect. The time for renewing the absorbing liquid cannot therefore be determined by examining the same and, in order to avoid a deficient absorptive effect during the analyses, a premature renewal of the absorbing liquid will be necessary for precautionary reasons. These disadvantages which the above-mentioned apparatuses—(viz. those in oné of which the absorption takes place by leading the gas against the top-surface of the absorbing liquid and in the other by leading the gas through the liquid)—possess are avoided by my present invention. I obtain this by connecting the measuring vessel which serves for collecting the gas, by means of two constantly open ducts with the absorption-vessel. One of these ducts ends below and the other above the top-surface of the absorbing liquid so that one part of the gas to be examined may be led against the surface of the liquid and the other part through this liquid, and that the remainder of the gas can be led back to the measuring vessel through the duct ending above the surface of the liquid.

As the greater part of the gas quantity is led through the absorbing liquid, the utilization of the same is a very good one, whereby a quick succession of the analyses is made possible. As the remainder of the gas collecting above the absorbing liquid can be led back into the measuring vessel through the duct serving for the surface-absorption, the chemical result can easily be read from the measuring vessel, a control of the absorption by repeating the process of absorption can be effected and a determination of the time for renewing the absorbing liquid can readily take place.

The accompanying drawing shows, by way of example, a view of an apparatus according to the present invention, partially in section.

$a$ designates the measuring vessel which is by means of the ducts $b$ and $c$ in communication with the vessel $d$ which contains the absorbing liquid. The gas to be examined is introduced into the measuring vessel through a pipe $i$. The measuring vessel $a$ is provided with a pipe $h$ which is in communication with the atmospheric air and which remains open when, under the pressure of the liquid contained in the vessel $f$, the gas is forced out of the measuring vessel $a$ and driven against the absorbing liquid, while the pipe $h$ may be closed when sucking a quantity of gas into vessel $a$. The vessel $f$ is connected with vessel $a$ by means of a flexible tube $k$ which allows the raising and lowering of vessel $f$, whereby the liquid contained therein may be caused to penetrate more or less into the measuring vessel $a$. Vessel $d$ is provided with a detachable funnel $g$ which may also serve for the reception of liquid forced away by the gas.

The operation of the apparatus is as follows: Fresh gases are introduced into the measuring vessel in any well-known manner. 100 cbcm. of this gas are collected in this vessel, when the surface of the liquid contained in vessel $f$ has reached the lower end of pipe $h$. Pipe $b$ penetrates so far into the vessel $a$ that at first about 20% of the gas is driven through pipe $b$ on to the top-surface of the absorbing liquid. When the liquid is caused to rise higher in vessel $a$ by raising the vessel $f$, the open end of pipe $b$ will be closed by the liquid and the remaining part of the gas, i. e. about 80%, will be driven through pipe $c$ and consequently through the absorbing liquid contained in vessel $d$. The remainders of the gas coming from the combined absorbing-process unite above the absorbing liquid, as the gas driven through this liquid rises in shape of bubbles to the top-surface of the same. This remainder of the gas can easily be sucked back into the measuring vessel through pipe $b$. The result of the chemical analyses can be read from the scaled measuring vessel by ascertaining the volume of the gas remainder. For the purpose of control, the process of absorption may be repeated with one and the same gas remainder as often as desired, it being only necessary to take care that no fresh gas enters the measuring vessel. The time for renewing the absorbing liquid results from the course of the absorption processes.

The apparatus may be so constructed that an automatic working and registering of the chemical result take place.

Having thus described my invention what I claim and desire to secure by Letters Patent, is:—

1. In an apparatus for analyzing gas, comprising a measuring vessel, an absorption-vessel and a hydraulic pumping device for forcing the gas to be analyzed from the measuring vessel into the absorption-vessel and sucking back the non-absorbed gas-remainder from the latter vessel into the first-mentioned one, two constantly open ducts connecting the measuring vessel, which is provided with a gas introducing pipe with the absorption-vessel containing the absorbing liquid, one of these ducts having one of its ends extending through the top end of the measuring vessel to a certain extent into the same and having the other end detachably fastened to and ending at the top-wall of the absorption-vessel, and the other duct having one end attached to and ending at the top of the measuring vessel and the other end air-tightly guided through the top-wall of the absorption-vessel and extending into the same to a point near the bottom of this vessel.

2. In an apparatus for analyzing gas, comprising a measuring vessel, an absorption-vessel and a hydraulic pumping device for pressing the gas to be analyzed from the measuring vessel into the absorption-vessel and sucking back the non-absorbed gas-remainder from the latter vessel into the first-mentioned one, two constantly open ducts connecting the measuring vessel, which is provided with a gas introducing pipe, with the absorption-vessel containing the absorbing liquid, one of said ducts ending below the top-surface of the absorbing liquid and leading a part of the gas to be analyzed through this liquid, and the other one ending above and leading a part of the gas against the surface of the absorbing liquid and serving to draw back the non-absorbed gas-remainder into the measuring vessel when the pumping device is correspondingly operated.

In testimony whereof I have signed my name to this specification in the presence of two subscribing witnesses.

OTTO MATZERATH.

Witnesses:
PAUL VREES,
RICHARD STROOF.